United States Patent
Akhteruzzaman

[11] Patent Number: 5,815,569
[45] Date of Patent: Sep. 29, 1998

[54] METHOD FOR CONTROLLING POWER LOSSES ASSOCIATED WITH LINE INTERFACE CIRCUITS IN TELECOMMUNICATIONS NETWORKS

[75] Inventor: Akhteruzzaman, Naperville, Ill.

[73] Assignee: Lucent Technologies Inc., Murray Hill, N.J.

[21] Appl. No.: 672,191

[22] Filed: Jun. 27, 1996

[51] Int. Cl.⁶ .............................. H04M 1/00; H04M 3/00; G05F 1/40
[52] U.S. Cl. ..................... 379/399; 379/377; 379/322; 379/387; 379/412; 379/413; 323/282
[58] Field of Search .................... 379/399, 387, 379/412, 413, 322, 219, 377; 323/282

[56] References Cited

U.S. PATENT DOCUMENTS

| | | | |
|---|---|---|---|
| 4,161,633 | 7/1979 | Treiber | 379/254 |
| 4,387,273 | 6/1983 | Chea, Jr. | 379/399 |
| 4,431,868 | 2/1984 | Bolus et al. | 379/373 |
| 4,622,441 | 11/1986 | Martin | 379/345 |
| 4,652,701 | 3/1987 | Cubbison, Jr. | 379/373 |
| 4,720,667 | 1/1988 | Lee et al. | 323/271 |
| 4,800,589 | 1/1989 | Siligoni | 379/413 |
| 5,146,384 | 9/1992 | Markovic et al. | 361/55 |
| 5,175,764 | 12/1992 | Patel et al. | 379/412 |
| 5,596,637 | 1/1997 | Pasetti et al. | 379/399 |

*Primary Examiner*—Daniel S. Hunter
*Assistant Examiner*—Charles N. Appiah
*Attorney, Agent, or Firm*—Mony R. Ghose

[57] ABSTRACT

A line interface circuit (LIC) used in telecommunications networks operates in either a high frequency mode or a low frequency mode, depending upon the status of its associated customer premises equipment. A LIC main controller detects a change in state of customer premises equipment via a battery feed circuit. If the customer premises equipment is off-hook, a switch associated with a resistor-capacitor (RC) circuit is activated to lower the resistance value of the RC circuit, and thereby, increase the operating frequency of the LIC. During on-hook intervals, the main controller deactivates the switch, and the LIC operates at a lower, default frequency.

11 Claims, 3 Drawing Sheets

METHOD FOR CONTROLLING POWER LOSSES ASSOCIATED WITH LINE INTERFACE CIRCUITS IN TELECOMMUNICATIONS NETWORKS

CROSS-REFERENCE TO RELATED APPLICATIONS

This application is related to the applications of Akhter-uzzaman entitled "Method For Customizing Operation Of A Line Interface Circuit In A Telecommunications Network", Ser. No. 08/672,190, and "Method For Customizing Operation Of A Battery Feed Circuit In A Telecommunications Network", Ser. No. 08/672,189, which applications are assigned to the assignee of the present application, and which were filed concurrently therewith on Jun. 27, 1996.

TECHNICAL FIELD

This invention relates to line interface circuits and, more particularly, to efficiently providing power to line interface circuits deployed in telecommunications networks.

BACKGROUND OF THE INVENTION

Line interface circuits (LICs) interconnect customer premises equipment (CPE) to central office switches in telecommunications networks via subscriber lines (also known as subscriber "loops"). For administrative purposes, a plurality of LICs are grouped to form an integrated services line unit (ISLU) in a central office switch. A modem LIC includes: a main controller; a switching converter circuit; a feedback circuit; analog-to-digital (A/D) and digital-to-analog (D/A) converters; and a battery feed circuit (hereinafter referred to as the "battery feed").

The main controller is an application-specific integrated circuit (ASIC) for regulating interactions between the LIC and network element of the switching module (SM) serving the subscriber loop. The switching converter circuit is responsible for providing adequate power to operate the LIC. A typical switching converter circuit includes: a transistor; a controller; a transformer circuit; a filter; and a resistor-capacitor (RC) circuit. The battery feed is comprised of a complex set of integrated devices for providing direct current (DC) to a subscriber loop. The DC current provided by the battery feed enables a CPE to access power required for operation, and enables interconnection of the CPE to the public-switched telephone network. The battery feed also couples audio signals transmitted by the central office switch to a subscriber using the CPE, and vice versa.

Due to the large number of LICs contained in an ISLU, maximizing the efficiency of individual LICs is of critical importance to the overall performance of the central office switch. An important determinant of efficient LIC operation is the dissipation of power. This is because power, in the form of heat and energy, emanates from various LIC components whenever the circuit is functioning. More particularly, eddy current and hysterisis losses result from operation of the transformer circuit, and semiconductor losses are a product of normal semiconductor circuit use. Although cooling devices are used to control the dissipation of heat occurring as a result of normal switch operation, these devices require significant space, and increase the cost of the switch.

Therefore, there is a need in the art for more efficiently operating LICs in a telecommunications network.

SUMMARY OF THE INVENTION

This need is addressed and a technological advance is achieved in the art by adjusting an operating frequency of a LIC switching converter circuit according to a detected state of its associated CPE.

In accordance with the preferred embodiment of the present invention, the main controller detects one of two possible states of the CPE associated with the subscriber loop. An active state indicates that a user has altered the CPE to conduct a call. In the case of a standard telephone station set, an active state is initiated whenever the user picks up a telephone handset to place, or receive, a call. Responsive to detection of the active state, the main controller issues a high frequency mode signal which activates a frequency control switch in a frequency selection circuit of the LIC. Activation of the frequency control switch alters the operating frequency of the LIC. In the high frequency mode, the operating frequency of the LIC is sufficient to provide high quality telecommunications services to the CPE.

When the CPE is functioning in an inactive state, (in the case of a standard telephone, the inactive state occurs when the user returns the telephone station handset to its original, rest position) the switching converter controller sends a low frequency mode signal to the frequency control switch. In the low frequency mode, the switch is deactivated resulting in a relatively low operating frequency. Since eddy current, hysterisis, and semiconductor losses are directly affected by frequency, LIC operation at low frequencies during on-hook mode produces a decrease in power loss. Significant power savings are achieved because CPEs usually remain in an inactive state, and the LICs are operated at a relatively high frequency only when the CPE is in use.

DETAILED DESCRIPTION

Figure 1:
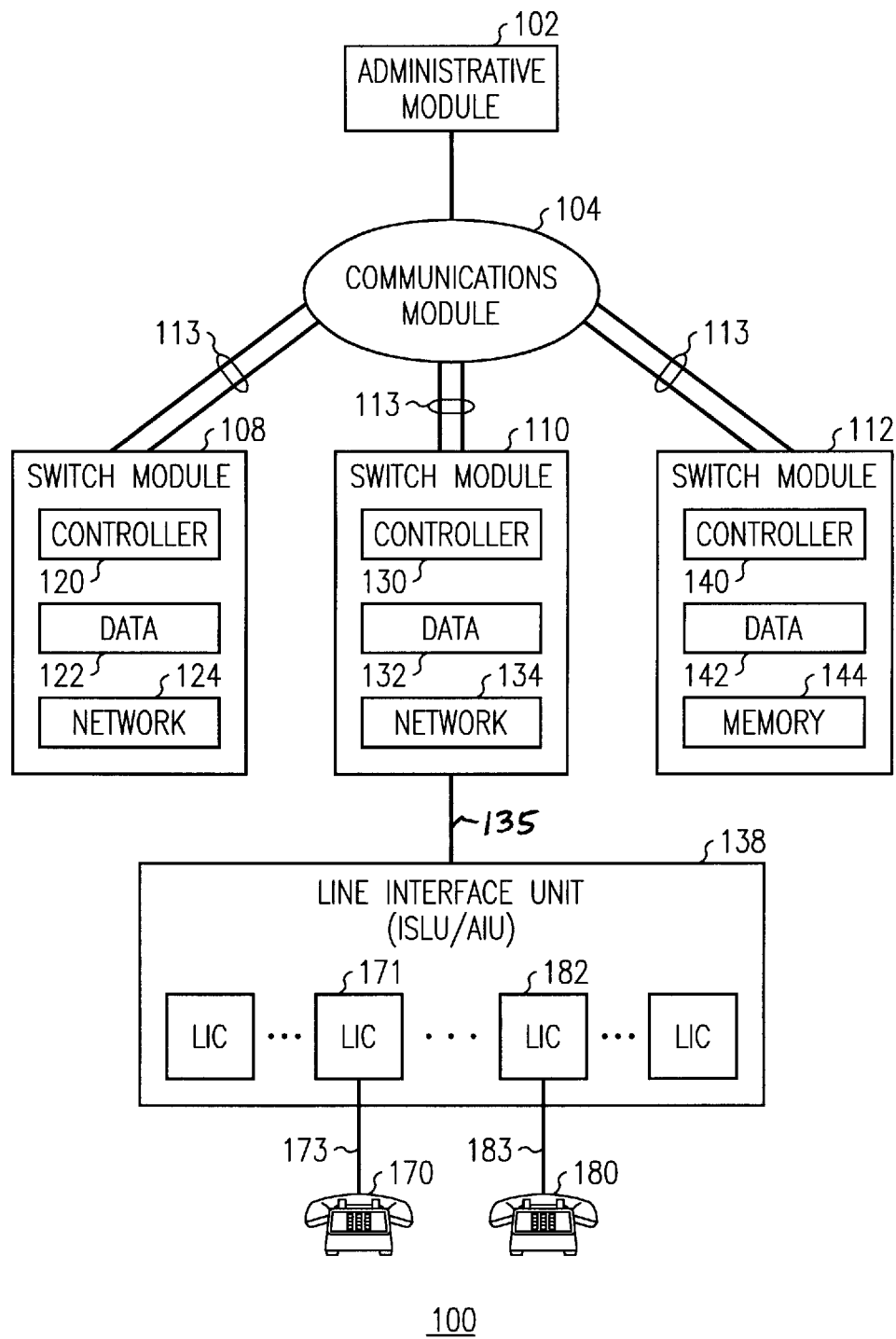
FIG. 1 is a simplified block diagram of a central office switch in which the preferred embodiment of the present invention may be practiced.

FIG. 1 shows a simplified block diagram of a central office telecommunications switch 100 (hereinafter, switch 100). In the preferred embodiment, switch 100 is the 5ESS® manufactured, and sold, by Lucent Technologies. Although a central office switch is shown, any system in which power is supplied to subscriber loops may be utilized.

Switch 100 includes three major components: administrative module 102 for providing system-wide administration, maintenance, and resource allocation; communications module 104 for serving as a distribution hub in switching voice, control information, and synchronization signals; and a plurality of switching modules (SM) 108, 110 and 112 for performing local switching and control functions. Communication among the elements of central office switch 100 is accomplished over network control and timing (NCT) links 113. As required by convention, dual NCT links are shown for the interconnection of each SM to communications module 104.

SMs 108, 110 and 112 include controllers for coordinating switching functions, memory for retaining specific subscriber line data, and network elements for routing calls to, and from, individual subscriber lines. In the embodiment shown, switch module 108 comprises controller 120, data memory 122, and network element 124. Similarly, switch module 110 includes controller 130, data memory 132, and network element 134. Switch module 112 comprises controller 140, data memory 142, and network element 144.

Each SM is equipped with an integrated services line unit (ISLU), also known as an access interface unit (AIU), for interconnecting each subscriber loop to the SM. Although an operational central office switch includes multiple ISLUs, a single ISLU is shown for clarity. Particularly, ISLU 138, comprised of a plurality of LICs, is interconnected to network element 134 of switch module 110 via link 135. Each subscriber loop served by switch 100 is interconnected to a network element via a particular LIC and ISLU. In this example, telephone 170 is interconnected to LIC 171 via subscriber line 173, and telephone 180 is interconnected to LIC 182 via subscriber line 183.

Figure 2:
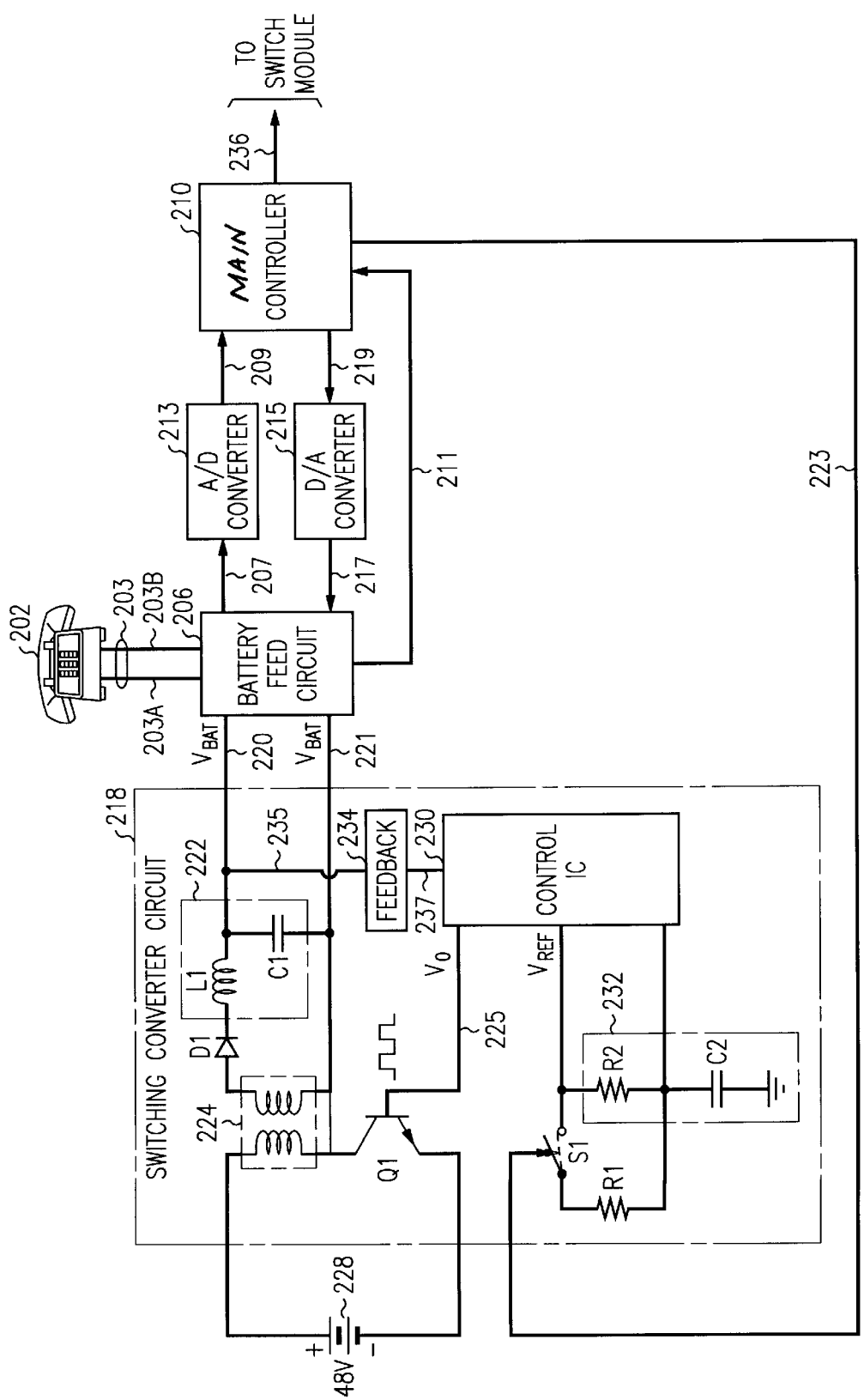
FIG. 2 is a block diagram of a LIC in accordance with a preferred embodiment of the present invention.

FIG. 2 is a detailed diagram of a LIC in which the preferred embodiment of the present invention may be practiced. In this example, LIC 200 interconnects telephone 202 to a serving central office switch (such as switch 100) via subscriber loop 203. The interconnection of subscriber loop 203 to the central office switch enables the switch to detect, and transmit, audio signals from telephone 202. Particularly, telephone 202 is interconnected to LIC 200 via subscriber loop 203 comprising "tip" line 203A, and "ring" line 203B both of which terminate at battery feed 206.

During operation, A/D converter 213 receives audio signals in analog format from telephone 202 via battery feed 206 and link 207. These analog audio signals are translated by A/D converter 213 into digital format, and delivered to main controller 210 over link 209. Conversely, D/A converter 215 receives digital signals from the switch module of the serving central office switch over link 219. The digital signals are converted to analog format by D/A converter 215, and delivered to battery feed 206 via link 217. Main controller 210 communicates with the switch module of the serving central office switch over signaling link 236.

Switching converter circuit 218 is interconnected to battery feed circuit 206 via leads 220 and 221. In the preferred embodiment, the switching converter circuit includes: transformer circuit 224; filter 222; transistor Q1; switching converter (semiconductor) controller 230; frequency selection circuit 232; and feedback detector 234. Transformer circuit 224 is designed to operate at a range of frequencies encompassing a low frequency value which is eighty percent (80%) of a high frequency value. In the preferred embodiment, a typical low-to-high LIC operating frequency range is 265 kHz to 320 kHz. A preferred low operating frequency is 270 kHz and a preferred high operating frequency is 310 kHz. Diode D1 rectifies the output of transformer circuit 224, as known in the art. Filter 222, comprised of inductor L1 and capacitor C1, serves to smooth the output voltage of transformer circuit 224, and meet ripple requirements of both low and high frequency operating modes. External power source 228 provides a −48 volts for operation of the switching converter circuit. In the preferred embodiment, frequency selection circuit 232 is an RC circuit including first resistor R1, second resistor R2, frequency control switch S1, and capacitor C2. At selected times, first resistor R1 is implemented by the activation of frequency control switch S1 under the control of main controller 210. Although an RC-based frequency selection circuit is shown, those skilled in the art will recognize that other means of frequency control, including resistor-inductance (RL) or semiconductor clock devices, may be used. Semiconductor controller 230 is interconnected to transistor Q1 via voltage link 225. Semiconductor controller 230 has an internal reference voltage (Vref) which operates at a frequency dictated by frequency selection circuit 232. Vref and frequency selection circuit 232 establish the operating frequency of output voltage Vo. As is known in the art, the frequency of output voltage Vo determines the switching frequency of transistor Q1.

The operating frequency of switching converter circuit 218 (that is, the switching frequency of transistor Q1) varies between two values (F1 and 0.8F1) depending upon to the state of the CPE associated with the subscriber loop. The operating frequency of switching converter circuit 218 is represented by the mathematical formula:

$$f = \frac{2.2}{RC}$$

In accordance with the preferred embodiment of the present invention, the RC constant of frequency selection circuit 232 is selectively altered by main controller 210 responsive to the state of telephone 202. More particularly, main controller 210 continuously monitors the state of telephone 202 via monitoring link 211 which is interconnected to battery feed 206. Whenever telephone 202 is in an inactive state (that is, the telephone is on-hook), controller 210 detects a first, default voltage value at battery feed 206. Detection of the default voltage by main controller 210 initiates a low frequency mode of operation of switching converter circuit 218. In low frequency mode, main controller 210 issues a low frequency signal (e.g. a digital "0") to frequency control switch S1 via signaling link 223. This low signal places frequency control switch S1 in an open position.

The RC constant value of frequency selection circuit 232 reflects the total resistance of circuit 232 multiplied by the total capacitance. In the low frequency mode, the RC constant of frequency selection circuit 232 is simply R2C2. Accordingly, the operating frequency of switching converter circuit 218 is 2.2/R2C2 (that is, the operating frequency is inversely proportional to the RC constant of frequency selection circuit 232). The RC constant value directly impacts the frequency of the output voltage Vo. During low frequency mode, Vo is such that Q1 switches slowly (relative to its switching rate during high frequency mode). The relatively slow switching of transistor Q1 results in proportional decreases in frequency-related eddy current and hysterisis losses from transformer circuit 224. A reduction in losses from diode D1, inductor L1, and transistor Q1 also occurs.

Telephone 202 is in active state when a user alters the CPE to place, or receive a telephone call. A common example of a telephone operating in active state occurs when a user lifts the handset of a telephone station. During the active state, main controller 210 detects a second voltage value at battery feed 206. As a result of detecting the second voltage value (that is, the off hook voltage), main controller 210 sends a high frequency signal (e.g. a digital "1") to frequency control switch S1 via signaling link 223. This "high" signal activates frequency control switch S1, causing the implementation of resistor R1 in frequency selection circuit 232. Accordingly, the RC constant value of the circuit is changed to R1R2/(R1+R2)C2. More particularly, when telephone 202 is in an active state, the RC constant value of frequency selection circuit 232 decreases. Accordingly, the operating frequency of switching transistor Q1 (and hence, switching converter circuit 218) increases. Increasing the operating frequency of switching converter circuit 218 allows battery feed 206 to deliver adequate power (that is, power which allows the central office switch to detect telephone 202) ($V_{bat}$) to subscriber loop 203 via leads 220 and 221.

Feedback circuit 234 is interconnected to lead 220, and semiconductor controller 230, via links 235 and 237, respectively. Feedback circuit 234 assures stability of switching converter 218 and LIC 200 for both high frequency and low frequency modes of operation. In the preferred embodiment, feedback circuit 234 is an RC combination.

Figure 3:
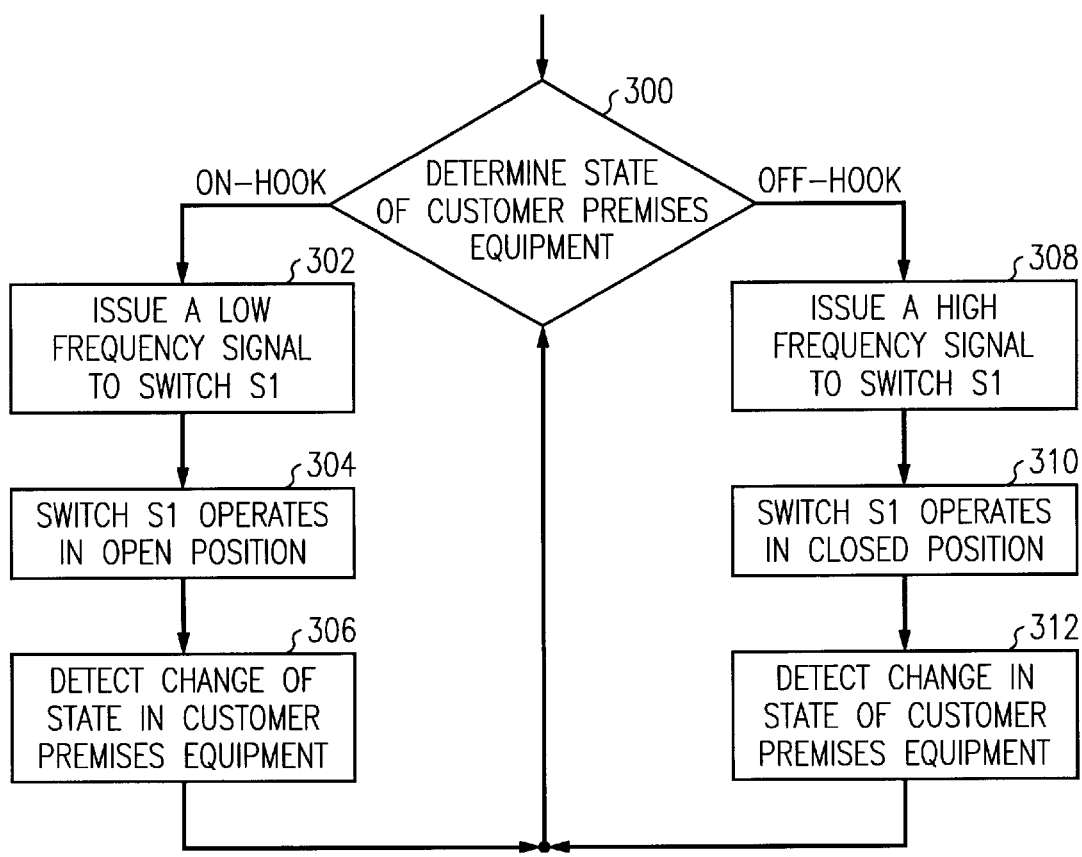
FIG. 3 is a flow diagram of the steps performed in the LIC shown in FIG. 2 according to a preferred embodiment of the method of the present invention.

FIG. 3 illustrates steps performed in accordance with the preferred embodiment of the method of the present invention. For purposes of example, assume that the process described below is implemented by LIC 200 for serving telephone 202. The process begins in decision step 300 in which main controller 210 determines the state of the CPE associated with subscriber loop which it serves. In other words, main controller 210 determines the "on hook"/"off hook" status of telephone 202. If the outcome of decision step 300 is an "ON-HOOK" determination, the process continues to step 302 in which main controller 210 issues a low frequency signal to frequency control switch S1 via signaling link 223. In step 304, frequency control switch S1 operates in an open position responsive to receipt of the low frequency signal. When frequency control switch S1 is in an "open" position, switching converter circuit 218 operates in a low frequency mode, as described above.

For illustrative purposes, assume that a caller associated with telephone 202 wishes to place a call. Accordingly, the caller alters the state of telephone 202 by lifting its handset. As a result of the caller's action, in step 306, main controller 210 detects a change in state of telephone 202. The process then returns to decision step 300 in which main controller 210 determines the state of telephone 202. In this instance, the outcome of decision step 300 is an "OFF-HOOK" determination, since the caller using telephone 202 has removed the telephone handset from its normal, on-hook position.

The process continues to step 308 in which main controller 210 issues a high frequency signal to frequency control switch S1 via signaling link 223. In step 310, frequency control switch S1 responds to the received signal by operating in a "closed" position. When frequency control switch S1 is activated, resistor R1 is deployed in frequency selection circuit 232, and the operating frequency of the switching converter circuit increases. In high frequency mode, the switching converter circuit supplies sufficient power to battery feed 206 to provide high quality telecommunications services to the user associated with the telephone 202. Subsequently, the caller completes the call, and returns the handset to its rest position. The process continues to step 312 in which the main controller detects the change in state of telephone 202. The process then returns to step 300 where the state of the CPE is again continuously monitored.

Advantageously, an appropriate amount of power is supplied to a subscriber loop when its associated CPE is in an active state but an energy-conserving, low operating frequency mode prevails when the CPE is not in use. By operating a LIC in an energy conservation mode during prolonged periods of non-use, frequency-related power losses associated with the operation of LICs are minimized. While the invention has been particularly illustrated and described with reference to the preferred embodiment, alternative embodiments may be devised by those skilled in the art without departing from the scope of the invention.

I claim:

1. In a central office switch interconnected to a plurality of subscriber lines via a plurality of line interface circuits (LIC), a method for decreasing power losses of at least one LIC comprises the steps of:

detecting a state of customer premises equipment (CPE) of a subscriber line in order to determine an appropriate operating frequency of the LIC responsive to the state of the CPE; and controlling a frequency control means so that the LIC may operate at the appropriate operating frequency.

2. The method of claim 1 wherein determining an appropriate operating frequency comprises the step of:

choosing a low frequency operating mode of operation of the LIC to minimize frequency-related power losses.

3. The method of claim 1 wherein determining an appropriate operating frequency comprises the step of:

choosing a high frequency operating mode of operation of the LIC to enable interconnection of the CPE to the central office switch.

4. The method of claim 1 wherein controlling a frequency control means comprises the step of:

activating a frequency control switch to alter an operating frequency of the LIC.

5. A telecommunications line interface circuit interconnecting a subscriber line to a central office switch comprises:

a battery feed circuit for transmitting messages between customer premises equipment, and a main controller coupled between a DC power source and the battery feed circuit;

a switching converter circuit;

a frequency selection circuit coupled to the switching converter circuit for controlling whether the switching converter circuit operates at a first or second frequency; and means for detecting an on-hook state of the subscriber line in order to operate the switching converter circuit at the first frequency which is lower than the second frequency used in response to detecting an off-hook state of the subscriber line.

6. The telecommunications line interface circuit of claim 5 further comprising a frequency control switch activated by the main controller, wherein activation of the switch alters the frequency selection circuit.

7. The telecommunications line interface circuit of claim 5 wherein the switching converter circuit operates at a first frequency when customer premises equipment is in an inactive state.

8. The telecommunications line interface circuit of claim 5 wherein the switching converter circuit operates at a second frequency when customer premises equipment is in an active state.

9. The telecommunications line interface circuit of claim 7 wherein the first frequency is 265 kHz.

10. The telecommunications line interface circuit of claim 8 wherein the second frequency is 320 kHz.

11. A method for decreasing frequency-related power losses in at least one line interface circuit (LIC) comprises the steps of:

detecting a status of customer premises equipment attached to a subscriber line served by the LIC in order to determine an appropriate operating frequency of the LIC responsive to the detected status of the customer premises equipment; and controlling frequency selection means to operate the LIC at the appropriate operating frequency.

* * * * *